United States Patent [19]

Shuman et al.

[11] Patent Number: 4,755,550
[45] Date of Patent: * Jul. 5, 1988

[54] READHERING AND REMOVABLE ADHESIVE

[75] Inventors: Ralph J. Shuman, Needham; Barbara Burns, Auburn, both of Mass.

[73] Assignee: Dennison Manufacturing Company, Framingham, Mass.

[*] Notice: The portion of the term of this patent subsequent to Feb. 17, 2004 has been disclaimed.

[21] Appl. No.: 29,031

[22] Filed: Mar. 23, 1987

Related U.S. Application Data

[63] Continuation of Ser. No. 900,112, Aug. 25, 1986, Pat. No. 4,684,685, which is a continuation-in-part of Ser. No. 822,505, Jan. 27, 1986, Pat. No. 4,644,026, which is a continuation-in-part of Ser. No. 756,870, Jul. 18, 1985, Pat. No. 4,657,960.

[51] Int. Cl.⁴ .............................................. C08L 7/00
[52] U.S. Cl. .................................. 524/270; 156/338; 156/344; 524/925
[58] Field of Search ................ 524/270, 925; 156/338, 156/344

[56] References Cited

U.S. PATENT DOCUMENTS

| 4,644,026 | 2/1987 | Shuman et al. | 524/270 |
| 4,657,960 | 4/1987 | Shuman et al. | 524/270 |
| 4,684,685 | 8/1987 | Shuman et al. | 524/270 |

Primary Examiner—Ronald W. Griffin
Attorney, Agent, or Firm—Barry D. Josephs

[57] ABSTRACT

A gelled solid adhesive for coating substrates, typically paper. The adhesive can be made available in stick form and is easily applied in even coats to any surface area of the substrate. The adhesive has sufficient tack enabling the coated substrate to instantly adhere to essentially any free contact surface upon gently pressing the substrate to the free surface. The adhesive coated substrate is easily removable from the contact surface by manually lifting it therefrom. The adhesive permits readherence of the adhesive coated substrate to the same or different free contact surfaces. An adhesive coated paper substrate will readhere many times to free paper contact surface. The preferred gelled adhesive product is formed of an aqueous dispersion of components which include a rubber such as natural rubber latex component, a friction reducing agent, a tackifier, an antioxidant, a gelling agent and surfactant. Preferred classes of tackifiers are anionic aqueous dispersion of hydrogenated esters of rosin and anionic aqueous dispersion of esters of hydrogenated rosin.

26 Claims, No Drawings

READHERING AND REMOVABLE ADHESIVE

This is a continuation, of Ser. No. 900,112, filed Aug. 25, 1986 U.S. Pat. No. 4,684,685, which is a continuation-in-part of patent application Ser. No. 822,505 filed Jan. 27, 1986, U.S. Pat. No. 4,644,026, which is a continuation-in-part of application Ser. No. 756,870 filed July 18, 1985, now U.S. Pat. No. 4,657,960.

BACKGROUND OF THE INVENTION

1. Field of the Invention

The present invention relates to a readhering and removable adhesive composition. The present invention relates to a readhering and removable adhesive in a solid stick form which can be evenly coated onto a surface.

2. Description of the Prior Art

Prior art adhesive available in solid form are known in the art. These adhesives, however, are commonly intended for use as a permanent adhesive, and therefore once a substrate is coated with the adhesive and the coated substrate applied to a receiving surface, it is not intended to be removable therefrom. One common adhesive of this type is often referred to as a "glue stick" or alternatively, an "adhesive applicator crayon". Solid or semisolid permanent adhesives available in a stick or crayon form are typically composed of water soluble or water dispersible adhesive components.

U.S. Pat. No. 3,576,776 is illustrative of the prior art. This reference discloses an "adhesive applicator crayon" which contains a water soluble film forming adhesive component which is typically polyvinyl-pyrrolidone. The formulation disclosed in this reference also includes a gel-forming salt, typically sodium stearate and aqueous liquid medium which may be water or mixtures of water and water miscible organic solvents. Constituents such as glycerine or ethylene glycol are typically included in the formulation disclosed in this reference to aid in moisture retention and to facilitate the ease with which the adhesive may be applied to a receiving substrate. The active adhesive component in the formulation is designated a water soluble or water dispersible film forming adhesive component. It would be recognized by those skilled in the art that the list of water soluble or water dispersible film forming adhesive components as disclosed in this reference, e.g., at column 2 lines 35-61 including the preferred polyvinyl pyrrolidone are permanent adhesive components, not intended for reusable, removable and readhering application. There is, furthermore, no intent expressed in this reference for use of the adhesive crayon formulation as a removable and readhering type of adhesive. Rather the adhesive formulation disclosed in this reference will form a permanent bond between two substrates.

Readhering adhesives, in contrast, when applied to a substrate should permit adherence of the coated substrate to a free contact surface, permit removal of the coated substrate and allow readherence of the coated substrate to another free surface.

Readhering adhesives are available, but heretofor are not successfully been commercialized in a semisolid or solid stick form from which even coatings of adhesive may be directly applied to a solid surface. Although attempts in the past may have been made to formulate a removable adhesive in a solid gelled form, such prior art formulations have been difficult to produce for a number of reasons. In practice, it has been found quite difficult to produce a formulation in jelled form which has just the right amount of tack that an adhesive bond between the coated substrate and a contact substrate may be obtained but yet exhibit the proper degree of removability that the adhesive coated substrate, may be removable from the contact substrate without tearing the substrates and without leaving behind residual adhesive. Additionally, it has proved difficult to formulate a removable adhesive in solid form, which exhibits the required degree of tack that enables initial bonding between the coated substrate and the contact surface, but yet permits readherence of the adhesive coated substrate once it has been removed from the contact surface.

Paper substrates which have been pre-coated with removable, readhering adhesives have, in recent years, become commercially available. One commonly known product of this type is marketed under the trade designation POST-IT note pads from the 3M Company. Although the POST-IT note pads exhibit sufficient tack, removability and readhering characteristics, they have the disadvantage to the user that they are readily available only in precoated, predesignated sizes and also are considered to be relatively quite expensive.

Accordingly, it is an object of the present invention to provide a gelled solid or semisolid adhesive which is readily coatable onto substrates typically paper, and exhibits sufficient tack, such that the coated surface easily adheres to a contact surface.

It is an important object of the present invention that the gelled adhesive exhibits sufficient tack which permits the adhesive coated substrate to adhere to a contact surface, but yet has the property that permits the adhesive coated substrate to be readily removable therefrom.

Another objective of the invention is to provide a gelled solid or semisolid adhesive which exhibits a high degree of removability and readhering characteristics permitting a substrate coated with the adhesive to be applied, removed and reapplied a number of times to and from a free contact surface without adding additional adhesive.

Another objective of the invention is to provide a gelled solid or semisolid adhesive which is readily coatable onto a substrate and which easily adheres to a contact surface, but yet does not leave behind residual adhesive on the contact surface when the adhesive coated substrate is removed therefrom.

SUMMARY OF THE INVENTION

In accomplishing the foregoing and related objects, a gelled, semisolid adhesive is provided having the following composition and properties: The adhesive composition of the invention is a gelled emulsion which is essentially a dispersion of solids in an aqueous medium. The resulting gelled adhesive product has a solid or semisolid consistency which is non-flowing and retains its shape at ambient temperature. The gelled adhesive product is, in effect, a solid, but yet penetrable by manual insertion of a pointed instrument. The term "solid" as used hereinafter shall be construed as including the solid and semisolid state and shall be understood to be non-flowing and shape retaining at ambient conditions. The gelled adhesive product of the invention is preferably made available in a stick form which can be conveniently housed in conventional containers which permit the user to adjust the amount of exposed adhesive. The user simply coats any area of a substrate, typically paper with the exposed end of the adhesive product. The adhesive product of the invention has the property that it is easily coatable over the surface of a substrate such as paper and readily permits application of even, uniform, coatings to the substrate by manually brushing the substrate with the exposed end of the adhesive product. Typically one or two strokes of the adhesive product over the surface of the substrate is sufficient to apply an even, uniform coating of adhesive on the substrate. Although the adhesive may be coated onto a variety of different substrate materials, including, paper, plastic, polymer film and glass, the adhesive is most advantageously used for coating paper substrate. The adhesive coated substrate will readily adhere to virtually any solid surface, including paper, wood, porcelain, plastic and glass surfaces as well as on painted plaster walls and panels. The adhesive coated substrate will essentially adhere to practically any solid contact surface by simply manually pressing the coated substrate to the contacting surface.

The adhesive coated substrate, which has been coated with the gelled solid adhesive composition of the present invention has a unique combination of properties. The adhesive composition of the present invention has the property that gives the coated substrate, such as adhesive coated paper, enough tack that it will readily adhere to virtually any solid contact surface including paper, wood, porcelain, plastic, glass and plaster by simply pressing the adhesive coated substrate to the solid surface. However, the adhesive does not form a permanent bond between the coated substrate and the contact surface. Rather the adhesive coated substrate is readily removable from the contact surface by manually lifting the substrate therefrom. The adhesive nevertheless exhibits sufficient tack to permit the coated substrate to remain adhered to the contact surface until the user wishes to remove the coated substrate. The adhesive coated substrate is very easily removed from the contact surface by simply easily lifting the adhesive coated substrate. The adhesive composition of the present invention has the important additional property that permits the user to reapply the adhesive coated substrate as many as eight to ten additional times to the same or another free solid surface. The adhesive coated substrate will readhere each time it is manually pressed onto the solid contact surface which may be the same surface to which it was previously applied or it may be an entirely different one.

Illustratively, a user may advantageously apply the adhesive of the present invention to a minor portion of the backside of note paper and then simply manually press the coated note paper to a contact surface, typically paper. The coated note paper will immediately adhere to the contact surface. Subsequently the note paper may be readily removed from the contact surface by simply lifting it therefrom. If desired, the user may reapply the same adhesive coated note paper to the same or different contact surface at least eight more times without application of additional adhesive.

The gelled adhesive composition of the present invention has the property that permits release of the adhesive coated substrate from the contact surface essentially without leaving behind any noticeable adhesive residue on the contact surface. It has been determined that essentially no adhesive residue will be left behind on the contact surface unless the user applies a very heavy coating to the initial substrate. The application of unusually heavy coating to the initial substrate is not within the realm of ordinary prescribed use of the adhesive. In the event the user applies an unusually heavy coating of adhesive to the substrate, any adhesive residue that does remain on the contact surface upon removal of the adhesive coated substrate can be easily and completely removed by gently rubbing the residue. Upon gentle rubbing, any residue left behind will easily peel off from the contact surface, leaving the contact surface clean and unharmed.

The gelled adhesive of the present invention, having the above described properties, includes as principal components, a natural rubber latex component, a tackifying agent and a gel forming agent. The preferred formulation for the gelled adhesive of the present invention is composed of: (A) an elastomeric (rubber) component, (B) a friction reducing agent, (C) a tackifier, (D) an antioxidant and (E) a gelling agent. A preferred rubber component having superior properties for the gelled adhesive formulation has been determined to be natural rubber latex. However, the formulation is not intended to be limited to inclusion of natural rubber latex, since in general, any other rubber component capable of being dispersed in water, aqueous solution, or in water based emulsion can be used advantageously in the gelled adhesive formulation of the present invention. Specific examples of other suitable rubber components are styrene butadiene, butyl rubber, polychloroprene (neoprene) and nitrile rubber. It has been determined that a surfactant (F) may be advantageously included to assure that the gelled adhesive retains the proper consistency and does not freeze or become rubbery when exposed to prolonged cold environmental conditions as low as about 0° F. which could be encountered on occasion during transit. All of the aforementioned components are preferably water soluble or water dispersible.

The natural rubber latex component is preferably supplied to the formulation in the form of an aqueous natural rubber latex dispersion (emulsion). The friction-reducing agent is advantageously selected from the class of polyhydric aliphatic alcohols, preferably dihydric and trihydric aliphatic alcohols. Preferred polyhydric aliphatic alcohols for the friction reducing agent are glycerine (e.g. 1,2,3 propanetriol) and propylene glycol. The tackifier is advantageously selected from the class of hydrogenated ester of rosin or the ester of hydrogenated rosin. The preferred tackifier is an aqueous tackifier resin dispersion (emulsion) advantageously an anionic aqueous dispersion of hydrogenated methyl ester of rosin. Another preferred tackifier has been determined to be an anionic (ion-tolerant) aqueous resin dispersion prepared from the gylcerol ester of a highly hydrogenated rosin. The antioxidant component in the above formulation, may be selected from a variety of known antioxidants. A preferred antioxidant is a ball-milled dispersion of 4,4 butylidene BIS powder in an aqueous base. The gelling agent is advantageously selected from known gel-forming salts, which are aliphatic carboxylic acid salts, typically aliphatic carboxylic acid salts containing an alkali metal cation. It has been determined that the preferred gel-forming salts for use in the present formulation is sodium stearate. The surfactant, if included, is advantageously selected from the class of nonionic surface active agents prepared by the reaction of octylphenol or nonylphenol with ethylene oxide. The resulting surfactant product is of the class alkylaryl polyether alcohol. A preferred surfactant is formed of the reaction product of an octylphenol with ethylene oxide resulting in an alkylaryl polyether chemically described as an octylphenoxypolyethoxyethanol, more preferably one having an average of five ethylene oxide units. The above listed components may be present in the gelled adhesive of the present invention in the following composition ranges as measured on an aqueous-free basis: the natural rubber latex may be present in a range between 5 to 20% by weight; the friction-reducing agent may be present between about 1–25% by weight; the tackifier between 15 and 70%/weight; the antioxidant between about 3.8–10% by weight; and the gelling agent between about 8 to about 25% by weight; and the surfactant between about 5 to 10% by weight.

DETAILED DESCRIPTION

The gelled adhesive product of the present invention can be made available in a solid stick form which the user can easily apply to evenly coat any portion of the surface of a substrate, such as paper and the like, by simply gliding an exposed end of the adhesive stick over the substrate. The principal components which applicant has discovered in combination form the essence of the present gelled adhesive formulation, are (a) an elastomeric (rubber) component; and (b) tackifying agent; and (c) gel forming agent. These components are desirably all water soluble or water dispersible. Any elastomeric (rubber) component capable of dispersion in water, aqueous solution, or water based emulsion can be employed advantageously in the gelled adhesive formulation of the present invention. A preferred rubber component imparting superior properties to the gelled adhesive formulation has been determined to be natural rubber latex. Other suitable rubber components can advantageously be selected from styrene butadiene, butyl rubbers, polychloroprene (neoprene) and nitrile rubber. Applicant has discovered that the combination of the rubber component preferably natural rubber latex and certain classes of tackifier primarily account for providing the required degree of tack to the adhesive product, but yet impart a release property which permits removal of the adhesive coated substrate from a contacting surface and reapplication of the adhesive coated substrate to the same or other free surface. Although other elastomeric polymers as above stated may be substituted for natural rubber latex, surprisingly natural rubber latex has proved to provide markedly superior properties in combination with the preferred classes of tackifier. The rubber component, preferably the natural rubber latex component has been determined to be a significant factor in imparting important properties to the adhesive product. It has been determined that the natural rubber latex component provides an excellent base for the formulation. The tackifier, if used alone, would not be suitably coatable onto a substrate. The combination of natural rubber latex with the tackifying agent, makes the formulation as a whole, easily coatable onto the substrate. The natural rubber latex component also imparts a releasability characteristic to the adhesive, such that adhesive coated substrate, after it has been pressed onto a contact surface may be easily removed therefrom by simply manually lifting the substrate from the contact surface. The natural rubber latex component has the additional property in combination with the tackifying agent, that little, if any, adhesive residue is left behind on the contact surface when the adhesive coated substrate is lifted therefrom. Small amounts of adhesive residue can be left behind on the contact surface only if the user coats the substrate very heavily with adhesive prior to applying it to the contact surface. This would be outside the realm of ordinary, recommended usage of the adhesive, since only one or two strokes of the adhesive stick need be applied to the substrate in order to evenly coat the substrate with an adequate amount of adhesive. However, in the event that the user inadvertently coats the substrate very heavily with adhesive, the natural rubber latex component included in the formulation assures the removability of any residual adhesive which is left behind on the contact surface. Such residual adhesive may be removed from the contact surface by simply manually rubbing the surface gently. Any residual adhesive left behind will thereupon easily peel off from the contact surface leaving the contact surface undamaged. It has been surprising to find the natural rubber latex component in combination with select classes of tackifying agents, provides just the right degree of tack necessary to assure adherence of the adhesive coated substrate to a contact surface and yet assures easy removability of the coated substrate from the contact surface so that the adhesive coated substrate may be readily applied over and over again.

If the gelled adhesive product of the invention composed of natural rubber latex, tackifying agent and gelling agent is coated onto a portion of a paper substrate the coated paper substrate will adhere immediately to virtually any contact surface including paper, wood, porcelain, plastic, glass and plaster walls. The adhesive coated paper substrate nevertheless may be readily lifted and removed from the contact surface and can be reapplied at least eight additional times to paper contact surfaces without need of replenishing the adhesive coat.

It is sufficient to coat only a minor portion of the substrate surface with the adhesive product. For example, a sheet of paper 8½ inch × 11 inch or smaller, including note paper 4 inch × 5 inch or smaller, need only be coated along one edge with a strip of adhesive of about ½ inch to assure sufficient tack to permit adherence of the substrate to a contact surface and exhibit all of the aforementioned removability and readhering characteristics.

A preferred natural rubber latex for use in the present formulation is available in the form of an aqueous natural rubber latex dispersion (water based emulsion). The natural rubber latex component is preferably of low ammonia content. A preferred natural rubber latex of low ammonia content is available under the trade designation, Natural Rubber Latex NC407 from the Uniroyal Company. Natural Rubber Latex NC407 is a water based emulsion of natural rubber latex with lauric acid included as an emulsifying agent. Commercially available natural rubber latex dispersions normally includes ammonia as a preservative which prevents the natural rubber from coagulating and putrefying from bacterial or enzymatic action after the latex has been obtained from the Hevea tree. Applicant has determined that the ammonia present in the commercial natural rubber latex dispersion, however, could interfere with the gelling of the adhesive composition if present in large amounts. Therefore, natural rubber latex having the lowest ammonia content is desirable. A preferred aqueous rubber latex dispersion available under the trade designation Natural Rubber Latex NC407 from the Uniroyal Company, has a low ammonia content and has been determined to be very suitable for use in the present adhesive formulation.

The tackifying agent for use in the present formulation is water dispersible or water soluble. Preferred tackifying agents, which applicant has determined, in combination with the natural rubber latex to yield the above described properties may be selected from the classes of hydrogenated esters of rosin and esters of hydrogenated rosin. A preferred tackifying agent of the former class is an anionic aqueous dispersion of hydrogenated methyl ester of rosin. An aqueous dispersion of hydrogenated methyl ester rosin, which has been determined to be suitable, is available under the trade designation HERCOLYN D-55WKX available from Hercules, Inc., Wilmington, Del. The HERCOLYN D-55-WKX tackifier resin dispersion is a 55% solids content anionic (ion-tolerant) aqueous dispersion of hydrogenated methyl ester of rosin. This particular tackifying resin has a total solids content of 54–56% solids, a viscosity at 25° C. of 500–2,500 centipoise and a pH of 9.5–11.5. The HERCOLYN D-55WKX aqueous dispersion, as commercially available, has the following typical properties: total solids content, 55%; viscosity at 25° C., 1500 centipoise; pH 10.5; base resin-colored, gardner #2; particle size 1 micron; emulsifier type, anionic.

An alternative tackifying agent selected from the class of ester of hydrogenated rosin which has proved advantageous in combination with the above described natural rubber latex, is an anionic (ion-tolerant) aqueous resin dispersion prepared from the glycerol ester of a highly hydrogenated rosin. A preferred anionic aqueous resin dispersion prepared from the glycerol ester of highly hydrogenated rosin is available commercially under the trade name FORAL 85-55WKX. The FORAL 85-55WKX tackifying agent has a total solids content of between about 53.5 to 56.5%; a viscosity of about 1450 to 3050 centipoise at 25° C.; a pH of about 9.02–11.0 and an average resin particle size of less than about 1 micrometer.

Applicant has determined that friction reducing agent is advisably included in the formulation, since the combination of natural rubber latex and tackifying agent by itself does not have quite the optimum degree of coatability that is required for consumer application of the gelled adhesive produce. Although a variety of friction reducing agents to improve the coatability of the product can be employed, the preferred friction reducing agents for use in the context of the present adhesive formulation is advantageously selected from a polyhydric aliphatic alcohol. The preferred polyhydric aliphatic alcohol for the friction reducing agent are advantageously dihydric and trihydric aliphatic alcohols. A preferred dihydric aliphatic alcohol is propylene glycol and a preferred trihydric aliphatic alcohol has been determined to be glycerine. In addition to improving the coatability of the adhesive, the foregoing classes of friction reducing agents helps to retain, moisture in the gelled adhesive product, thus preventing the product from becoming hard and brittle during prolonged storage. Additionally, the polyhydric aliphatic alcohols tend to protect the gelled adhesive product from freezing if subjected to cold weather during shipment or storage.

Preferably an antioxidant is included in the formulation to stabilize the composition against ambient oxidation and oxidative degradation. The antioxidant prevents yellowing or browning of the product adhesive as a result of slow oxidation which in turn gives the product an unattractive appearance. Selection of a suitable antioxidant for use in the present formulation to prevent oxidative degradation is within the experience of those skilled in the art. A preferred antioxidant for use in the present formulation is available under the trade designation HEVEATEX D407A antioxidant which is a ball-milled dispersion of 4,4 butylidene BIS powder in a aqueous base. HEVEATEX D407A dispersion is available from the HEVEATEX Corp. of Fallriver, Mass.

An alternative preferred antioxidant exhibiting excellent antioxidative properties for the present adhesive product may contain the combination of TI-NOX WLE antioxidant dispersion and TI-ZATE B antioxidant. TI-NOX WLE antioxidant is a high potency, non-staining, non-discoloring antioxidant available in the form of an aqueous dispersion from Technical Industries, Inc., Peach Dale, R.I. TI-NOX WLE product contains a butylated reaction product of paracresol and dicyclopentadiene and a liquid carrier such as ditridecylthidipropionate. (The butylated reaction product component above mentioned is available under the tradename WINGSTAY-L from Goodyear Chemical Division and the ditridecylthidipropionate is available under the tradename CYNOX 711 from American Cyanamide Rubber-Chemical Division). TIZATE B antioxidant is an aqueous dispersion containing ZINC dibutyldithiocarbonate and is manufactured by Technical Industries, Inc., Peach Dale, R.I.

The adhesive formulation of the present invention importantly also includes a gelling agent. The gelling agent is necessary in order to cause coagulation of all of the solids in the formulation, thus resulting in a solid gelled adhesive product. Without the gelling agent, the adhesive product would remain as an aqueous solid dispersion in liquid form. Suitable gelling agents for aqueous dispersion are known in the art. Such agents, for example, are disclosed in U.S. Pat. No. 3,576,776 all of which are incorporated herein by reference. A preferred class of gelling agent for use in the context of the present formulation has been determined to be a salt of an aliphatic carboxylic acid wherein the cation consists of an alkali metal. Applicant has determined that the use of sodium stearate is the preferred gelling agent for the present formulation. Sodium stearate causes the solids in the formulation to gel quickly upon cooling, thus permitting easy commercial production of the gelled adhesive product in any desired shape.

The surfactant, if included, is advantageously selected from the class of anionic surface active agents prepared by the reaction of octylphenol or nonylphenol with ethylene oxide. The resulting products are of the class alkylaryl polyether alcohols. A preferred surfactant of this class is the reaction product of an octylphenol with ethylene oxide resulting in an alkylaryl polyether chemically described as an octylphenoxypolyethoxyethanol, more preferably one having an average of five ethylene oxide units per molecule.

The alkylaryl polyether class of surfactants is available commercially under the trademark TRITON series of surfactant from Rohm and Haas Company, Philadelphia, Pa. The preferred surfactant which is an octylphenoxypolyethoxyethanol containing an average of five ethylene oxide units per molecule is commercially available under the trademark TRITON X-45 from Rohm and Haas Company. The TRITON X-45 surfactant is an oil soluble nonionic surface active agent which is also biodegradable. It is miscible in most polar organic solvents and aromatic hydrocarbons but essentially insoluble in water. Typical properties of TRITON X-45 surfactant is viscosity, cps at 25° C. of 290; pour point (ASTM D-97) −26° C.; specific gravity at 25° C. 1.040.

Although the surfactant may optionally be excluded from the adhesive formulation it has been found advantageous to include it to assure that the gelled adhesive product does not freeze or become rubbery when exposed to prolonged very cold environmental conditions which could be encountered on occasion during transit. It has been determined that the above referenced preferred surfactant will protect the gelled adhesive even during prolonged exposure to temperatures as low as about 0° F.

Ranges of the above described components of the present formulation which have been determined to be suitable is reported on a water-free basis as follows: the natural rubber latex may be present in a range between about 5–20% by weight; the friction reducing agent, e.g., glycerine may be present between about 1–25% by weight; the tackifying agent, for example, HERCOLYN D-55-WKX tackifier maybe present between about 15–70 weight percent solids; the antioxidant may be present between about 3.8–10% by weight, and the gelling agent, e.g., sodium stearate between about 8–25% by weight and surfactant, if included, may typically be between 5 to 10% by weight. The gelled adhesive product typically has a penetrometer hardness of between about 11 mm and 36 mm as measured in accordance with ASTM D-1321.

Preferred formulations employing the above described components, which result in the gelled adhesive product of the present invention, are shown in Table I and II. The formulations set forth in the respective tables are reported in the first column as percent by weight based on the total aqueous dispersion, that is including all water present in each of the listed constituents as supplied by the vendor. The second column is a tabulation of the preferred formulation on a water-free basis, that is essentially on a solid basis with the exception of the friction-reducing agent which is available typically in natural liquid state. The gelled adhesive product made with the formulation shown in the Tables I or II has a penetrometer hardness of about 20 mm as measured in accordance with ASTM D-1321. The gelled adhesive product made in accordance with the formulations set forth in Table I and II will have an average shelf life of several years or longer under normal conditions.

TABLE I

| ADHESIVE COMPOSITION | BASIS: Total Aqueous Dispersion Input Formulation Wt. % | INPUT FORMULATION Water Free Basis Wt. % |
|---|---|---|
| Natural Rubber Latex (e.g. Natural Rubber Latex NC-407) | 14.6 | 13.8 (Solids) |
| Friction Reducing Agent (e.g. Glycerine or propylene glycol) | 4.9 | 7.5 (liq.) |
| Tackifier (e.g. HERCOLYN D55-WKX) | 61.2 | 52.3 (Solids) |
| Antioxidant (e.g. HEVEATEX D407A) | 4.2 | 3.3 (Solids) |
| Gelling Agent (e.g. Sodium Stearate) | 10.2 | 15.6 (Solids) |
| Surfactant (e.g., TRITON-X45) | 4.9 | 7.5 |
| TOTAL | 100.0 | 100.0 |

TABLE II

| ADHESIVE COMPOSITION | BASIS: Total Aqueous Dispersion Input Formulation Wt. % | INPUT FORMULATION Water Free Basis Wt. % |
|---|---|---|
| Natural Rubber Latex (e.g. NC-407) | 13.2 | 12.8 (Solids) |
| Friction Reducing Agent (e.g. Glycerine or propylene glycol) | 6.0 | 9.4 (liq.) |
| Tackifier (e.g. HERCOLYN D55-WKX or FORAL 85-WKX) | 55.2 | 48.3 (solids) |
| Antioxidant TI-NOX WLE | 2.9 | 2.2 (solids) |
| TIZATE B | 2.6 | 2.2 (solids) |
| Gelling Agent (e.g. Sodium Stearate) | 11.7 | 18.2 (Solids) |
| Surfactant (e.g., TRITON X-45) | 4.4 | 6.9 |
| Additional Water | 4.0 | — |
| TOTAL | 100.0 | 100.0 |

The preferred formulations of the gelled adhesive product as discussed in the foregoing and as illustrated in the Tables are advantageously prepared in the following manner. With specific reference to Table I and II, all of the listed constituents are mixed in the proportions shown in the column 1 of the respective Tables. All of the components except the gelling agents are first supplied to a closed vessel at room temperature. It has been found desirable to add the constituents to the closed vessel under ambient room temperature in the following order, while continually mixing the components. The natural rubber latex component can be added first to the vessel. While continually stirring at room temperature, the following constituents listed in Table I may be added at about 15 minute intervals: the friction reducing agent, the antioxidant, surfactant and then the tackifying agent. The mixture is continually stirred at ambient temperature until a homogenous mix is obtained. The mixture is then gradually brought to a temperature of about 165°–175° F. over the course of about one hour while continually stirring. As the contents gradually reaches a temperature of between about 165° F.–170° F. the gelling agent, preferably sodium stearate, is added in the proportions shown in the first column of Table I. The contents are continually mixed at about 170° F. for an additional half hour to assure that all of the components become solubilized in the mixture. The mixture is then ready for pouring into individual containers. The mixture is poured hot into individual containers in a continuous assembly line operation. It should be appreciated that the containers may be of any shape, but typically they are of cylindrical shape. The containers, after they are filled with the hot liquid mixture, are left to cool at ambient room temperature. As the liquid cools, the gelling effect occurs gradually. When the liquid reaches room temperature, upon cooling the gelling enters its final state resulting in a gelled solid adhesive product. The solid adhesive product naturally takes the same shape as the container. The container may be fitted with conventional mechanical means which allows the user to expose fresh adhesive for use in coating a substrate as required. It will be apparent that the container may be fitted with a variety of devices which permits the user to conveniently push up fresh solid to an exposed end of the container. Containers of this type are readily available in the ordinary consumer market.

Although the adhesive product of the invention has been described within the context of particular embodiments, the invention is not intended to be limited to the specific composition described in the preferred embodiment. The uses for the adhesive product of the invention as discussed herein, have also been provided for illustrative purposes. Similarly it should be recognized that the adhesive product may be supplied in any desired shape, and any referenced shape is not intended to be limiting. The invention, therefore, is not intended to be limited to the description in the specification, but rather is defined by the claims and equivalent thereof.

What is claimed is:

1. A gelled adhesive product in solid form comprising:
   an elastomeric component; a water soluble or water dispersible tackifying agent; and a gelling agent; said gelled adhesive product having the combination of properties resulting in an adhesive coatable onto a substrate surface area by gliding the adhesive product over the substrate surface, the adhesive having sufficient tack permitting the adhesive coated area on said substrate to immediately adhere to a solid contact surface as said adhesive coated substrate is pressed against the contact surface, the adhesive also having sufficient release property permitting removal of said adhesive coated substrate from said contact surface upon lifting the coated substrate from the contact surface, said adhesive having the additional property permitting said same adhesive coated substrate to readhere to a solid contact surface upon pressing said same coated substrate thereto without applying additional adhesive.

2. An adhesive product as in claim 1 wherein the tackifying agent is selected from the group consisting of the hydrogenated ester of rosin and the ester of hydrogenated rosin.

3. An adhesive product as in claim 2 wherein the tackifying agent comprises hydrogenated methyl ester of rosin.

4. An adhesive product as in claim 2 wherein the tackifying agent comprises the glycerol ester of hydrogenated rosin.

5. An adhesive product as in claim 1 further comprising a friction reducing agent comprising a polyhydric aliphatic alcohol.

6. An adhesive product as in claim 5 wherein the friction reducing agent is glycerine.

7. An adhesive product as in claim 5 wherein the friction reducing agent is propylene glycol.

8. An adhesive product as in claim 1 further comprising an antioxidant.

9. An adhesive product as in claim 1 wherein the gelling agent is a gel-forming salt of an aliphatic carboxylic acid.

10. An adhesive product as in claim 9 wherein the gel-forming salt of the aliphatic carboxylic acid has an alkali metal cation.

11. An adhesive product as in claim 1 wherein the gelling agent is sodium stearate.

12. An adhesive product as in claim 1 wherein the elastomeric component has a low ammonia content.

13. An adhesive product as in claim 1 wherein the elastomeric component comprises between about 5 to 20 percent by weight of the product on a water free basis.

14. An adhesive product as in claim 13 wherein the tackifying agent comprises between about 15 to 70 percent by weight of the product on a water free basis.

15. An adhesive product as in claim 1 having a substantially cylindrical shape.

16. A gelled adhesive product as in claim 1 wherein the substrate is paper.

17. A gelled adhesive product as in claim 16 wherein the substrate is paper and the contact surface is paper and the adhesive coated substrate has the property that it is removable from and will readhere at least eight times to a paper contact surface.

18. An adhesive product as in claim 1 further comprising an surfactant comprising an alkylaryl polyether alcohol.

19. An adhesive product as in claim 18 wherein the alkylaryl polyether alcohol is formed of the reaction product of an octylphenol and ethylene oxide.

20. An adhesive product as in claim 19 wherein the alkylaryl polyether alcohol comprises octylphenoxypolyethoxyethanol having an average of five ethylene oxide units per molecule.

21. In a gelled adhesive product in solid form comprising a water soluble or water dispersible tackifying agent and a gelling agent, the improvement comprising:
   the adhesive product further comprising a elastomeric component, said adhesive product having the combination of properties resulting in an adhesive coatable onto a substrate surface area by gliding the adhesive product over the substrate surface, the adhesive having sufficient tack permitting the adhesive coated area on said substrate to immediately adhere to a solid contact surface as said adhesive coated substrate is pressed against the contact surface, the adhesive also having sufficient release property permitting removal of said adhesive coated substrate from said contact surface upon lifting the coated substrate from the contact surface, said adhesive having the additional property permitting said same adhesive coated substrate to readhere to a solid contact surface upon pressing said same coated substrate thereto without applying additional adhesive.

22. An adhesive product as in claim 21 wherein the tackifying agent is selected from the group consisting of the hydrogenated ester of rosin and the ester of hydrogenated rosin.

23. An adhesive product as in claim 21 further comprising a friction reducing agent comprising a polyhydric aliphatic alcohol.

24. An adhesive product as in claim 21 further comprising a surfactant comprising an alkylaryl polyether alcohol formed of the reaction product of an octylphenol and ethylene oxide.

25. A gelled adhesive product as in claim 1 wherein the elastomeric component is capable of dispersion in water based emulsion.

26. A gelled adhesive product as in claim 21 wherein the elastomeric component is capable of dispersion in water baged emulsion.

* * * * *